United States Patent [19]

Vadala

[11] Patent Number: 4,773,707
[45] Date of Patent: Sep. 27, 1988

[54] HEADREST ATTACHMENT

[76] Inventor: Peter S. Vadala, 380 Essex St., Lynnfield, Mass. 01940

[21] Appl. No.: 173,739

[22] Filed: Mar. 28, 1988

[51] Int. Cl.⁴ ............................................. A47C 7/36
[52] U.S. Cl. .................................. 297/391; 297/220; 297/DIG. 1
[58] Field of Search ............... 297/391, 410, 220, 460, 297/DIG. 1

[56] References Cited

U.S. PATENT DOCUMENTS

| | | | |
|---|---|---|---|
| 3,101,217 | 8/1963 | Requa | 297/391 |
| 4,165,125 | 8/1979 | Owen | 297/220 |
| 4,274,673 | 6/1981 | Kifferstein | 297/391 |
| 4,385,783 | 5/1983 | Stephens | 297/410 |
| 4,420,186 | 12/1983 | Vogt | 297/284 |
| 4,693,515 | 9/1987 | Russo et al. | 297/391 |
| 4,711,496 | 12/1987 | Lathers et al. | 297/460 |

Primary Examiner—Francis K. Zugel
Attorney, Agent, or Firm—William Nitkin

[57] ABSTRACT

A headrest attachment of a plurality of interconnected cushion members adapted to be wrapped around a seat headrest to provide a larger and closer surface area behind the user's head.

6 Claims, 3 Drawing Sheets

HEADREST ATTACHMENT

BACKGROUND OF THE INVENTION

1. Field of the Invention

The device of this invention resides in the area of headrests and more particularly relates to a headrest accessory which has multiple cushions and which affixes to an existing headrest of a seat.

2. Description of the Prior Art

Headrests on seats such as the seats of motor vehicles are well known and are provided in many shapes and sizes. Many headrests though are too small, ill-positioned and/or uncomfortable to lean against. Some headrests are positioned too far away from the user's head so that in the event of an accident, whiplash injuries can still occur even with the use of a headrest because of the great distance, during normal operation of a vehicle, between the operator's head and the headrest. Further some headrests are positioned so low they will not block any rearward movement of the user's head, and they can in some cases impact the rearwardly moving user too low on the back to be of any effective help in preventing injury during a motor vehicle accident. Also many headrests fail to provide any support for the user's head during normal operation of the vehicle because of the great distance between the headrest and the rear of the user's head. Further, many existing headrests are constructed of very hard material which could injure a person if the person's head were forcefully moved rearwardly against such hard headrest. Some headrests are also uncomfortable because of their shape and/or construction material.

SUMMARY OF THE INVENTION

It is an object of this invention to provide an auxiliary cushion structure to be used in conjunction with existing headrests on seats of motor vehicles or other types of seats which auxiliary cushion structure is adjustable in a variety of positions to fit the many different shaped headrests as exist in the prior art. The auxiliary cushion structure of this invention is comprised of a series of cushion members in one embodiment engaged together by a pair of cords extending through apertures defined in each of the cushion members. In other embodiments the cushions can be held together by other means such as snaps, velcro or equivalent fastening means. The cushion members are positionable against the headrest and are wrapped therearound to provide cushioning in front of the headrest. They also act to extend the upper height of the headrest by positioning one or more of the cushions on top of the headrest. Such auxiliary cushion structure provides a comfortable surface against which a user, such as a driver, can rest his head. The cushion structure also reduces the space existing between the driver's head and the headrest. Thus in the event of an accident, the presence of the cushion structure of this invention can prevent whiplash injuries from occurring as they might otherwise occur when the head is moved backwards such as during a rearend collision against a headrest not having the auxiliary cushion structure of this invention thereon.

DESCRIPTION OF THE PREFERRED EMBODIMENT(S)

Figure 1:
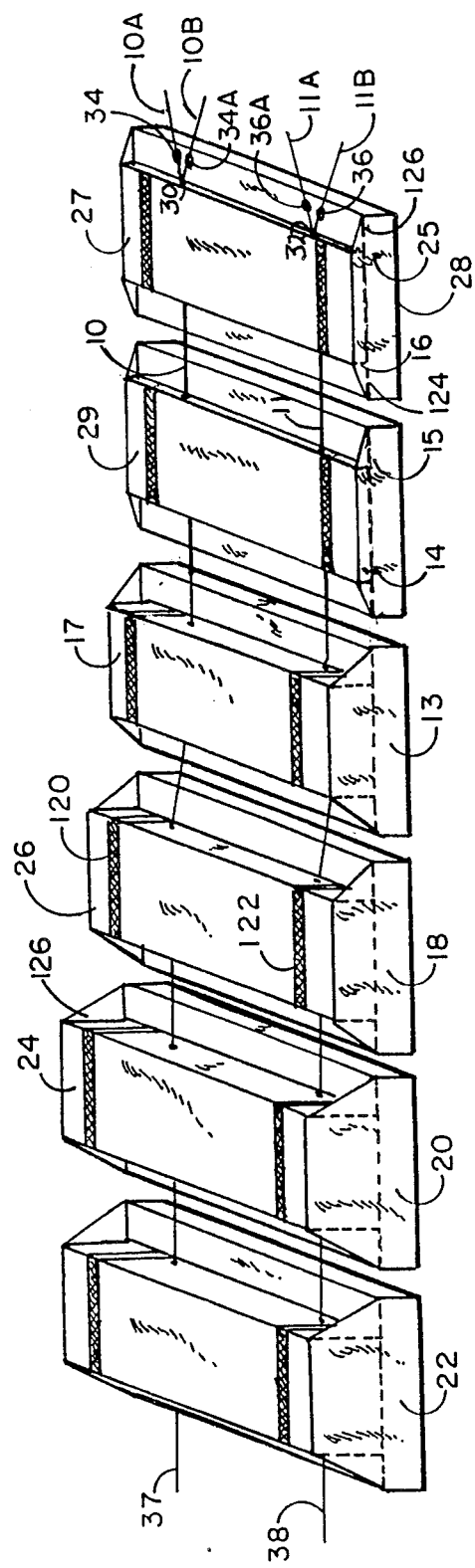
FIG. 1 illustrates a rear perspective view of the device of this invention extended in a straight fashion to illustrate the parts thereof.
Figure 2:
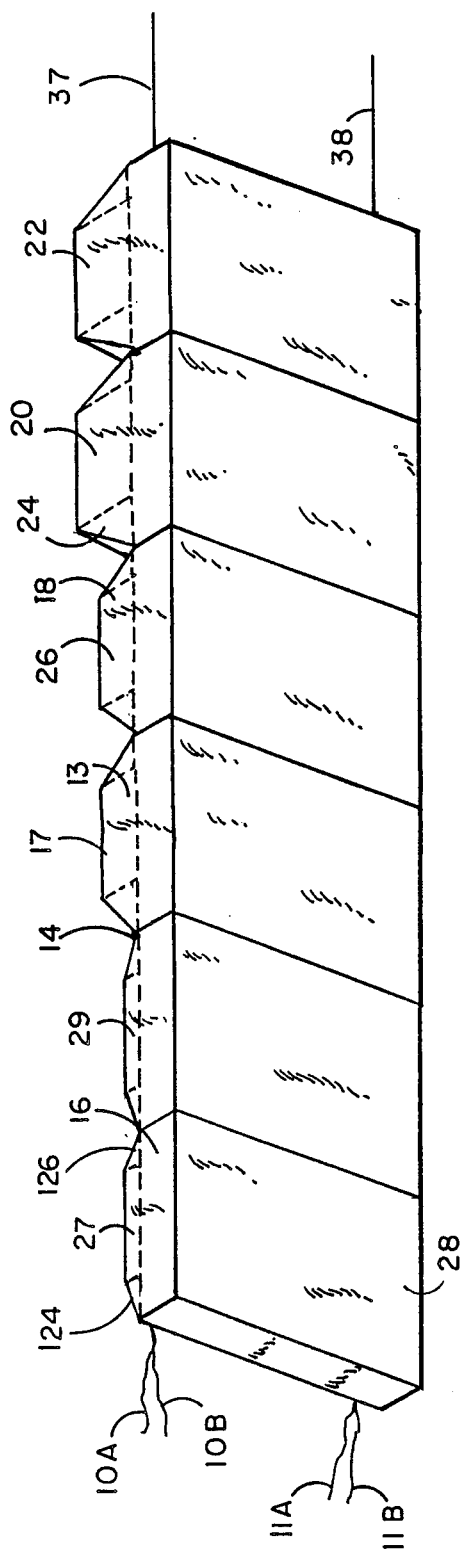
FIG. 2 illustrates a front perspective view of the device as illustrated in FIG. 1 with the cushions positioned together.
Figure 3:
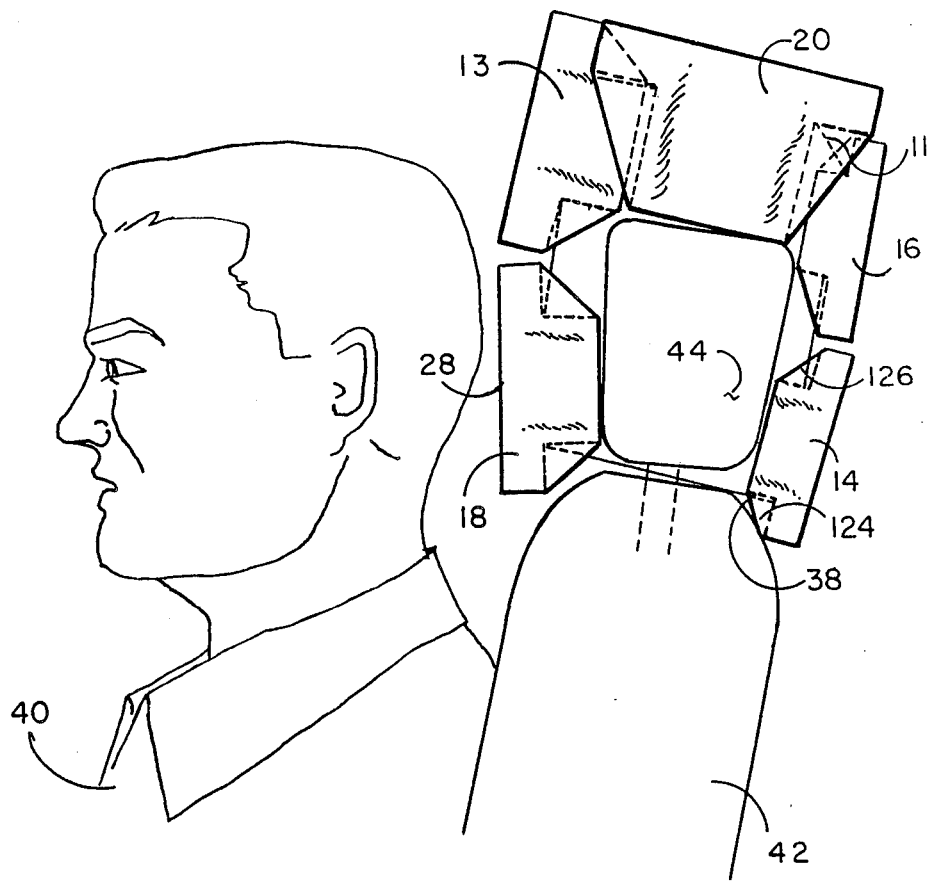
FIG. 3 illustrates a side view of a driver in a seat with the device of this invention in position around the seat headrest.

FIG. 1 illustrates a rear perspective view of the device of this invention with the plurality of cushions arrayed one above the other and separated from one another. This is not the normal arrangement of such cushions as they would be installed on a headrest but such view is used here to illustrate the structure of the device of this invention when it is not installed on a headrest. Seen in this view is first cushion 16 which has a flat front surface 28 as seen in FIG. 2 and which on the rear thereof has a section forming first cushion rear protrusion 27. Through this rear protrusion 27 or between the first cushion and the rear protrusion cushion are formed first and second cord apertures 30 and 32 through which first cord 10 and second cord 11 are passed respectively, which cords extend to second cushion 14 and pass through similar apertures formed in second cushion 14. Such apertures can also be formed by plastic tubing extending between the cushions as will be described below. Cords 10 and 11 extend through similar apertures formed in each of the succeeding cushions. Cords 10 and 11 can each have protruding from the end of first cushion 16 two portions 10a and 10b and 11a and 11b, each of which is independent and unattached to one another in the mode shown. Cords 10 and 11 can be affixed to cushion 16, but the remaining cushions are slideably movable on the cords and can be removed therefrom if desired and repositioned thereon and/or rearranged in any order. It should be noted that the protruding portions 27 and 29 of first and second cushions 14 and 16 are approximately ¼ inch in length beyond base portions 25 and 15 which are ¾ inch thick whereas the protruding portions 17 and 26 can extend approximately 1 ¼ inches beyond third and fourth cushions 13 and 18 which are ¾ inch thick, respectively. The protrusions on fifth and sixth cushions 20 and 22, such as fifth cushion rear protrusion 24, extend approximately 2 ¼ inches beyond the base portion which is ¾ inch thick. The cushion can be approximately 5 inches high with each protrusion approximately 2 ½ inches high. A soft thin cushioning layer such as of foam can be provided over each cushion's flat front surface such as flat front surface 28. First and second cord members 11 and 10 respectively are adapted to pass through apertures formed in each of the cushion and such cord members can also have first and second loops 34 and 34a and 36 and 36a, respectively, formed in each cord member with first and second trailing ends 37 and 38, respectively, extending out beyond sixth cushion 22. When installed as seen in FIG. 3, the rear cushion protrusions are abutted against seat 42 or seat headrest 44 in a fashion so that some of the flat fronts of the cushions, for example flat front surface 28, are positioned behind the driver. By utilizing the particular cushions having the proper height of the rear cushion protrusion, one can fill the distance between the headrest and the rear of the driver's head with cushioning. In FIG. 3 top cushion 20 is positioned above headrest 44 and is interconnected by first cord 11 as seen, with second cord 10 not seen in this view as it is positioned therebehind, and the cushion increases the effective height of the headrest structure so as to form rear support for the head of the driver. The balance of the cushions can either be eliminated by removal from the cords or be extended down behind the seat and trailing ends 37 and 38 of the cords can be passed upwards under headrest 44 and tied through first and second cord loops 34, 34a, 36 and 36a respectively or to other portions of cords 10 and 11 extending between the cushions so as to tightly affix the cushion members arrayed around the headrest. Cords can also be used in a crisscross pattern to help hold the cushions in place by attaching to or retaining the cords 10 and 11 around the headrest. Snaps or mating velcro pieces on each cushion can also hold the cushion array together around the headrest to help retain the cushions in place. Rubberized strips 120 and 122 can be positioned on the protrusion cushion surface to contact the headrest and have a frictional contact therewith to help keep the cushions in place and prevent slipping. Different arrangements of the cushion members can be utilized depending upon the type of headrest which new arrangement can be achieved by removing the cushions from the cords and replacing them back on the cords in a different order and by leaving off unused cushions. For example, for headrests that protrude forward substantially, less area is needed to be filled and the narrower first and second cushions could be utilized in front of the headrest, thereby filling such smaller area. However, if the headrest is of a smaller variety and is positioned much further away from the head, the fifth and sixth cushions being of greater thickness could be positioned behind the user's head to fill the space between the user's head and the headrest. In this way the arrangement of the cushions can be adapted to the type of headrest utilized. The order and/or position and spacing apart of the cushions can also be changed since they are movable on the cords and can be, if desired, removed and replaced on the cords in a different order. Thus the cushion arrangement as shown in FIG. 1 could be changed by rearrangement of the cushions on the cords to iit any number of variations of headrests. By increasing the surface area of the existing headrest by the positioning therearound of the cushions of this invention during an automobile accident, such as, for example, a rearend collision, there would be less pounds per square inch of force against the back of the user's head because of such greater surface area of the cushions than the surface area of the headrest. Also the cushions above and to the rear of the headrest help to reduce the chances of debris or a passenger sitting in the rear from striking the driver or the front seat passenger, and these cushions further provide cushioning for a rear passenger to strike against.

It should be further noted that the rear cushion protrusions which are shorter in height than the height of the base cushions can take other shapes other than the rectangular shape as shown such as having the sides shaped at an angle. Such cushions can be foam-filled or air-filled bags with a covering thereover and can be provided in a variety of shapes coming to a narrower and smaller rear side protrusion for positioning against the headrest and the small spaces between the headrest and the seat and seat itself, and exposing a larger front side for the resting of the head thereagainst. In some instances it may be desirable to position two cushions behind the head and one or more above, and the combinations of the various rear cushion protrusion depths can allow a variety of arrangements of cushions and combinations thereof that could be useful depending upon the size, thickness and positioning of the seat headrest.

Figure 4:
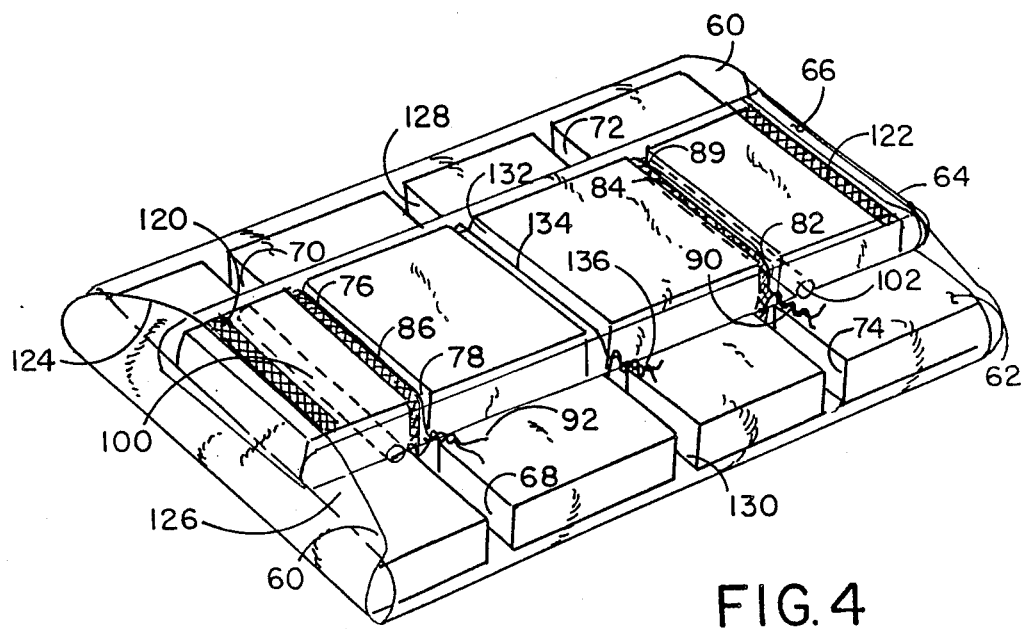
FIG. 4 illustrates an alternate embodiment of a cushion showing a simple means of construction.

FIG. 4 illustrates an alternate cushion construction that does not utilize sewing but instead covering 60 can be wrapped around base cushion 62 and a second piece of covering 64 can be wrapped around protrusion cushion 66. The loose ends of coverings 60 and 64 can be facing inward between the two cushions where they can be tucked and/or glued. In another embodiment covering 60 can extend up over the ends of protrusion cushion 66 leaving side flaps 124 and 126 as seen in the cushions in the other figures. Base cushion 62 can have slots 68, 70, 72, 74, 128 and 130 defined therein and protrusion cushlon 66 can have slots 76, 78, 89, 82 and 132 defined therein. A first circular elastic band 84 can be placed around base cushion 60 and protrusion cushion 66 to extend into slots 72, 89, 82, and 74 and a second circular elastic band 86 can extend around and in slots 70, 76, 78 and 68, both elastics 84 and 86 holding protrusion cushion 66 movably positioned against base cushion 62. Extending also around with each elastic band 84 and 86 and in slots 128, 130 and groove 132 are wire members 90, 92 and 134 with the ends of each wire protruding out between base cushion 60 and protrusion cushion 66. As the elastic bands hold the two cushions together, the covering material can be tucked therebetween after being folded around each cushion and the loose ends can be held or glued between the cushions. To prevent undesired separation of the cushions, the ends of wire members 90, 92 and 134 can extend around both cushions, one of each with each of elastic bands 84 and 88 and one by itself with the end of the wire members extending out between the cushions, where they can then be twisted together such as at point 136 to tighten them in position. This binding by wire members 90, 92 and 134 permanently fixes the two cushions together. Grooves defined on the face of each cushion can be provided for the elastic bands and wires to fit into so they will not protrude and he fell beneath the covering. Hollow tuhes 100 and 102 disposed between the base and protrusion cushions can be provided for the cords to pass through. Other methods of cushion manufacture could also be used.

Although the present invention has been described with reference to particular embodiments, it will be apparent to those skilled in the art that variations and modifications can be substituted therefor without departing from the principles and spirit of the invention.

I claim:

1. A device for positioning around an existing headrest on a seat, comprising:
   a plurality of base cushion members each having a front and a rear with a substantially flat face on the front thereof and a rear cushion protrusion on the rear of each, the height of such rear cushion protrusion being narrower than the height of the front of said base cushion, said device having first and second cord receipt apertures defined between said base cushion members and said rear cushion protrusions and a first and second cord passing respectively through said first and second cord receipt apertures, said cords interconnecting one cushion to another, said structure adapted to be positioned around said headrest to provide a surface area closer to the user's head in the user's normal sitting position than that provided by the seat's headrest.

2. The structure of claim 1 wherein there are six base cushion members with two ¾ inch deep base cushion members each having a ¼ inch rear cushion protrusion, two ¾ inch deep base cushion members each having a 1 ¼ inch rear cushion protrusion, and two ¾ inch deep base cushion members each having a 2 ¼ inch rear cushion protrusion.

3. The structure of claim 2 wherein said base cushion members are removable from said cords and can be rearranged and said cords reinserted into said cord receipt apertures to change the order of said base cushion members on said cords.

4. The structure of claim 3 wherein said base cushion includes a pair of slots defined opposite one another on each side and said rear cushion protrusion includes a pair of slots defined opposite one another on each side thereof matching the position of the slots defined on said base cushion, said structure further including:

a base cushion covering wrapped around said base cushion with its loose ends disposed between said base cushion and said rear protrusion cushion and a rear cushion protrusion covering disposed around said rear cushion protrusion with its loose ends disposed between said rear protrusion cushion and said base cushion;

a pair of elastic bands extending around and in each pair of slots in said base cushion and said rear cushion protrusion adapted to hold them together and to retain said loose ends of the covering therebetween; and a pair of wires each disposed with one of said elastic bands, said wires adapted for their ends to be twisted together forming a permanent means to affix said base cushion to said rear cushion protrusion.

5. The structure of claim 4 wherein said loose ends of said coverings are tucked and held between said base cushion and said rear cushion protrusion and said ends are further held in place by glue.

6. The structure of claim 5 further including rubberized frictional members positioned on the surface of said rear protrusion cushion adapted to frictionally engage against said headrest to help hold said device in position.

* * * * *